United States Patent
Erpenbeck

(10) Patent No.: US 11,828,321 B2
(45) Date of Patent: Nov. 28, 2023

(54) TOLERANCE-COMPENSATING DEVICE COMPRISING COUPLING MEANS

(71) Applicant: WITTE Automotive GmbH, Velbert (DE)

(72) Inventor: Till Erpenbeck, Velbert (DE)

(73) Assignee: WITTE Automotive GmbH, Velbert (DE)

(*) Notice: Subject to any disclaimer, the term of this patent is extended or adjusted under 35 U.S.C. 154(b) by 276 days.

(21) Appl. No.: 16/693,082

(22) Filed: Nov. 22, 2019

(65) Prior Publication Data

US 2020/0173473 A1 Jun. 4, 2020

(30) Foreign Application Priority Data

Nov. 29, 2018 (DE) .......................... 102018130391.2

(51) Int. Cl.
*F16B 5/02* (2006.01)
*F16B 5/06* (2006.01)

(52) U.S. Cl.
CPC .......... *F16B 5/0241* (2013.01); *F16B 5/0628* (2013.01); *F16B 5/0635* (2013.01)

(58) Field of Classification Search
CPC .... F16B 5/0088; F16B 5/0233; F16B 5/0241; F16B 5/025; F16B 5/0258; F16B 5/0283; F16B 5/0628; F16B 5/065; F16B 5/0635; F16B 5/0657; F16B 5/0664; F16B 41/002; Y10T 403/45; Y10T 403/454; Y10T 403/75
USPC ...................................... 403/220, 224, 408.1
See application file for complete search history.

(56) References Cited

U.S. PATENT DOCUMENTS

| | | | |
|---|---|---|---|
| 2,861,618 A * | 11/1958 | Tinnerman | F16B 37/041 411/175 |
| 4,286,642 A * | 9/1981 | Keatley | F16F 1/36 403/220 |
| 4,529,244 A | 7/1985 | Zaydel | |
| 4,765,057 A | 8/1988 | Muller | |
| 5,039,264 A * | 8/1991 | Benn | F16B 37/041 411/175 |
| 5,288,191 A * | 2/1994 | Ruckert | F16B 5/0233 403/409.1 |

(Continued)

FOREIGN PATENT DOCUMENTS

| | | |
|---|---|---|
| DE | 3308630 A1 | 9/1984 |
| DE | 4424750 C1 | 2/1996 |

(Continued)

OTHER PUBLICATIONS

Search Report from German Patent and Trademark Office for DE102018130391.2, dated Sep. 18, 2019.

(Continued)

*Primary Examiner* — Josh Skroupa
(74) *Attorney, Agent, or Firm* — Wiggin and Dana LLP

(57) ABSTRACT

A device for compensating for tolerances between two components which are to be connected by a connecting screw, comprising a base element and a compensating element which can be moved out of the base element, the base element and the compensating element forming a passage for the connecting screw that defines an axial direction, and a coupling means of the device being designed to couple the device to a carrier element and to guide the device along the carrier element.

18 Claims, 12 Drawing Sheets

(56) References Cited

U.S. PATENT DOCUMENTS

| | | | | |
|---|---|---|---|---|
| 6,474,917 B2* | 11/2002 | Gauron | ................. | F16B 37/044 |
| | | | | 411/112 |
| 6,971,830 B2* | 12/2005 | Hulin | .................... | F16B 5/0635 |
| | | | | 411/112 |
| 7,878,745 B2* | 2/2011 | Allen | ...................... | F16B 27/00 |
| | | | | 411/175 |
| 7,896,596 B2* | 3/2011 | Rausch | ................. | F16B 37/041 |
| | | | | 411/174 |
| 8,231,317 B2* | 7/2012 | De Gelis | .............. | F16B 5/0266 |
| | | | | 411/174 |
| 8,696,279 B2* | 4/2014 | Sbongk | ................ | F16B 5/0635 |
| | | | | 411/174 |
| 9,267,529 B2* | 2/2016 | Tejero Salinero | .... | F16B 37/041 |
| 9,482,264 B2* | 11/2016 | Lutgenau | ............... | F16B 5/0283 |
| 9,511,544 B2* | 12/2016 | Hemingway | ......... | F16B 5/0233 |
| 9,738,135 B2* | 8/2017 | Gonzalez Rechea | ......................... | |
| | | | | F16B 5/0258 |
| 9,816,547 B2* | 11/2017 | Costabel | ............... | F16B 37/044 |
| 10,047,783 B2* | 8/2018 | Mills | ...................... | F16B 37/044 |
| 10,533,588 B2* | 1/2020 | Yoyasu | ................. | F16B 5/0635 |
| 10,670,069 B2* | 6/2020 | Costabel | ............... | F16B 5/0635 |
| 10,823,217 B2* | 11/2020 | Costabel | ............... | F16B 5/0635 |
| 11,454,264 B2* | 9/2022 | Erpenbeck | ............. | F16B 5/0628 |
| 2017/0138388 A1* | 5/2017 | Figge | ..................... | F16B 37/041 |
| 2018/0298936 A1* | 10/2018 | Brautigam | ............. | F16B 5/0233 |
| 2022/0299051 A1* | 9/2022 | Bente | .................... | F16B 5/0283 |
| 2022/0373010 A1* | 11/2022 | Bente | .................... | F16B 5/0283 |

FOREIGN PATENT DOCUMENTS

| | | | |
|---|---|---|---|
| DE | 69807692 T2 | 1/2003 | |
| DE | 10319647 B3 | 9/2004 | |
| DE | 102005051473 A1 | 5/2007 | |
| DE | 602005005690 T2 | 4/2009 | |
| DE | 102016104187 A1 | 9/2017 | |
| EP | 0886071 A1 | 12/1988 | |
| EP | 0886071 A1 | 12/1998 | |
| EP | 2127956 A1 | 12/2009 | |
| EP | 3242043 A1 | 11/2017 | |
| GB | 2281260 A | 3/1995 | |
| JP | 2008256058 A | * 10/2008 | .............. F16B 5/025 |

OTHER PUBLICATIONS

European Patent Office, search report for EP19212020.2, dated Apr. 23, 2020.

* cited by examiner

FIG. 5A
FIG. 5B
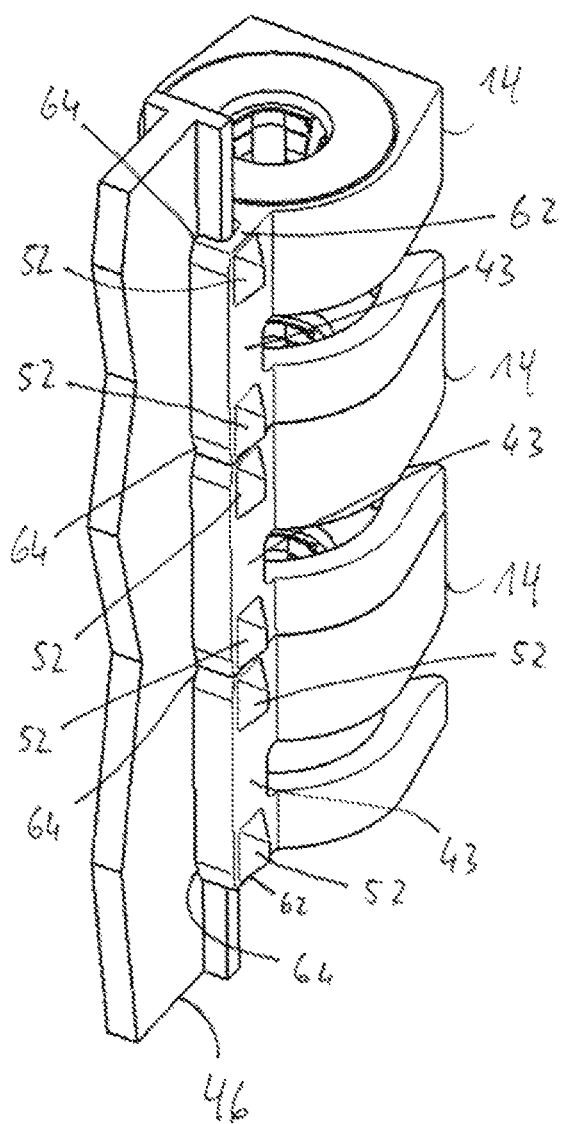
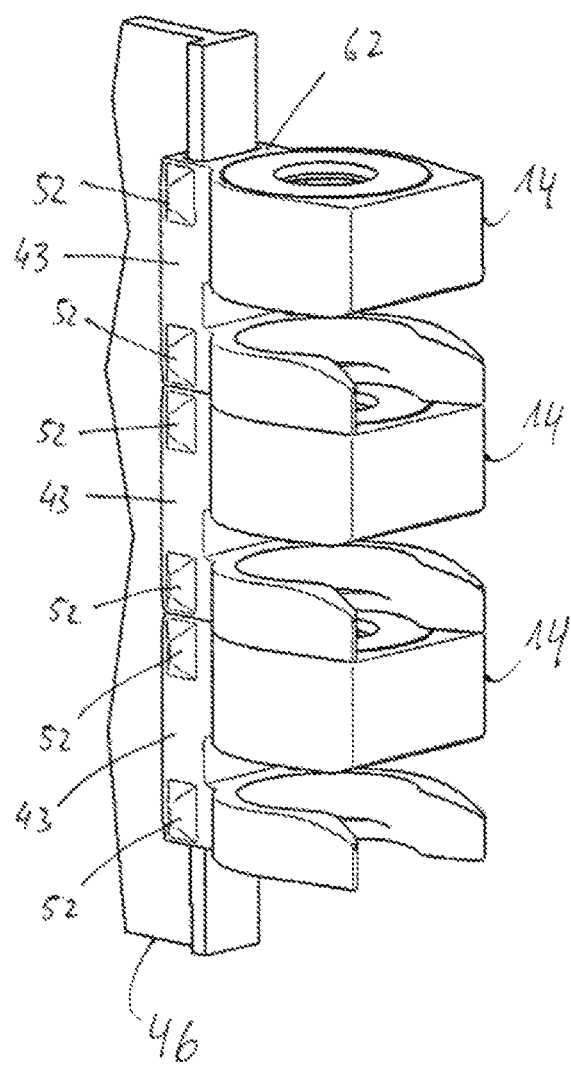

TOLERANCE-COMPENSATING DEVICE COMPRISING COUPLING MEANS

CROSS-REFERENCE TO RELATED APPLICATION

The present application claims priority to German Patent Application No. 102018130391.2 that was filed Nov. 29, 2018, the contents of which is hereby incorporated by reference in its entirety.

TECHNICAL FIELD

The present invention relates to a device for compensating for tolerances between two components which are to be connected by means of a connecting screw, comprising a base element and a compensating element which can be moved out of the base element, the base element and the compensating element forming a passage for the connecting screw that defines an axial direction.

BACKGROUND

A device of this kind, which is also referred to as a tolerance-compensating device, is known in principle and, for example, is used in the construction of automobiles for the purpose of compensating for tolerances in the spacing between a first component, e.g. a carrier structure, bodywork or similar, and a second component which is to be mounted thereon, e.g. a roof rack, dashboard, door, hood, a seat, trunk lid or similar, which compensation is in the axial direction. The device can in this case, depending on the mounting specifications, optionally be pre-mounted on the first component or the second component. For this purpose, the device is fastened by the base element on the first component, for example. The compensating element is then moved upwards out of the base element in the direction of the second component until the end face of the compensating element comes to rest on the second component. The components can now be clamped to one another by the connecting screw which extends through the components and the device.

A movement of the compensating element out of the base element can take place, for example, by the compensating element being rotated out of the base element. For this purpose, the base element and the compensating element can be in a threaded engagement, preferably in a left-hand threaded engagement, such that the compensating element is automatically rotated out of the base element when the connecting screw is screwed into an associated nut element. A torque transmission means, for example in the form of a spring element, is normally provided in the passage of the compensating element in order to transmit a torque of the connecting screw to the compensating element.

Before they are used as intended, the devices are held in a storage container, in which they are normally oriented as required. In order to be able to mount a device in a desired manner, a correct orientation of the device with respect to the first component is necessary. This has previously been achieved by a manual setting process, in which a device is removed from the storage container and then fastened to the first component by hand. A procedure of this kind is therefore time consuming and ultimately also costly.

BRIEF SUMMARY OF THE INVENTION

The problem addressed by the invention is to provide a device for compensating for tolerances that is suitable for an automatic setting process.

In order to solve the problem, a device for compensating for tolerances is provided, having the features of claim 1. The tolerance-compensating device according to the invention is characterized by a coupling means which is designed to couple the device to a carrier element and to guide the device along the carrier element.

The invention is based on the general concept of providing a tolerance-compensating device having a coupling means which allows the coupling of the tolerance-compensating device to the carrier element, by means of which the tolerance-compensating device can be supplied to a setting robot in a correctly oriented manner, such that said robot attaches the tolerance-compensating device in the desired manner to a first component of the components that are to be connected. The setting process can thus be automized, as a result of which the setting process, in comparison with a manual setting process, can be carried out more easily, precisely, replicably, and ultimately also cheaply.

An additional advantage of the invention is that, by means of the coupling means, the devices can be arranged, i.e. oriented in a defined manner, stored in a magazine and guided. Storage of this kind can be advantageous even in a manual setting process, since each of the devices can be removed from the magazine in a correctly oriented manner. Advantageous embodiments of the invention can be found in the dependent claims, the description and the drawings.

According to a particularly simple embodiment of the device, the coupling means is formed on the base element. In this case, the base element can have at least one fastening means for fastening the device to the first component, which fastening means can be designed in the form of a retaining clip, latching portion, clamping means, or similar, for example.

Alternatively, the coupling means can also be formed on a retaining element for retaining the base element. Similar to the base element, the retaining element can also have at least one fastening means of the previously described type.

It is also conceivable to not provide the coupling means on the base element or retaining element, but instead on the compensating element.

It is self-evident that the base element or the retaining element can also be integrally fastened to the first component, e.g. by the element being glued or welded in place on the first component, in addition or as an alternative to a frictional and/or interlocking fastening.

The device which is coupled to the carrier element is subject to a particularly advantageous orientation for a subsequent setting process, when the coupling means has a longitudinal extension which is oriented at least approximately parallel to the axial direction. In principle, the longitudinal extension of the coupling means, depending on the case of use, can also be oriented transversely, in particular at a right angle, to the axial direction.

According to one embodiment, the coupling means comprises a slot which defines at least one undercut. As a result, the coupling means can engage behind a complementary rib of the carrier element, and the device can be guided in any spatial direction without the device in this case detaching from the carrier element unintentionally. The rib of the carrier element can be engaged behind particularly well when the slot is a T-slot, an L-slot, a round slot, a dovetail slot or similar.

In order for it to be possible for the device to be easily brought into engagement with the carrier element, the slot advantageously has a widening portion on at least one of the longitudinal ends thereof. The widening longitudinal end of the slot facilitates to a certain extent the threading of the device onto the carrier element. The longitudinal end of the slot in this case is on a longitudinal end of the coupling means that defines the coupling means in the direction of the longitudinal extension thereof.

Instead of a slot, the coupling means can also comprise an arm which defines at least one undercut and extends radially or tangentially away from an outer wall of the base element or an outer wall of the retaining element. It is self-evident that the carrier element in this case has a complementary slot which engages behind the undercut of the arm in order to couple the device to the carrier element.

In order for it to be possible for the device to be easily brought into engagement with the carrier element, i.e. easily threaded onto the carrier element, the coupling means advantageously has a tapering portion on at least one of the longitudinal ends thereof. As a result, the longitudinal end defines the coupling means in the direction of the longitudinal extension thereof.

A particularly good engagement between the device and the carrier element can be achieved in that the arm transitions into at least one angled hook portion at the free end thereof which faces away from the outer wall of the base element or the outer wall of the carrier element, such that the coupling means as a whole has a T-shaped or L-shaped cross section, for example. Instead of a hook portion, the arm can also have a differently designed, undercut end portion on the free end thereof which faces away from the outer wall of the base element or the outer wall of the carrier element, for example such that the coupling means has a cross-section which is round, in particular in the shape of a mushroom, dovetail or similar.

In the case that the coupling means has an arm which has a hook portion or an end portion which is differently undercut, the coupling part forms in certain respects a slot nut, which can be guided in a slot of the carrier element when the device is in the coupled state.

In order for a setting robot to be able to better grip the device, but also in order for the device to be positioned and orientated exactly by the setting robot, a guide element is advantageously provided on the coupling means. For the same purpose, a magnetizable, in particular ferromagnetic, element can additionally or alternatively be provided on the coupling element, in particular embedded in said coupling element.

At least two guide elements are advantageously provided on opposite longitudinal sides of the coupling means, in order to facilitate a correct orientation of the device in the setting robot.

In addition, the guide element formed on the coupling means can also be used to orient and/or guide the device on a carrier element.

The guide element can, for example, be designed in the form of a prismatic or hipped roof-like projection on the coupling means. It is also conceivable, however, that the guide element is a notch in the coupling means.

The invention also relates to a system comprising at least one device of the type described previously, and a carrier element for receiving and guiding the at least one device. The device is preferably movably guided by the coupling means relative to the carrier element, as a result of which the device can be easily supplied to the setting robot.

A particularly high level of freedom in terms of design is produced when the carrier element is flexible at least in portions. For specific cases of use, the carrier element can alternatively or additionally be rigid at least in portions. In addition, it is conceivable that the carrier element is tubular, such that the carrier element surrounds the coupled device in the radial direction.

BRIEF DESCRIPTION OF THE DRAWINGS

The invention is described below in a purely exemplary manner by means of possible embodiments with reference to the drawings, in which:

FIGS. 5A and 5B are perspective views of a plurality of tolerance-compensating devices of FIG. 1, which are threaded onto a T-shaped carrier element;

DETAILED DESCRIPTION OF THE INVENTION

Figure 1A:
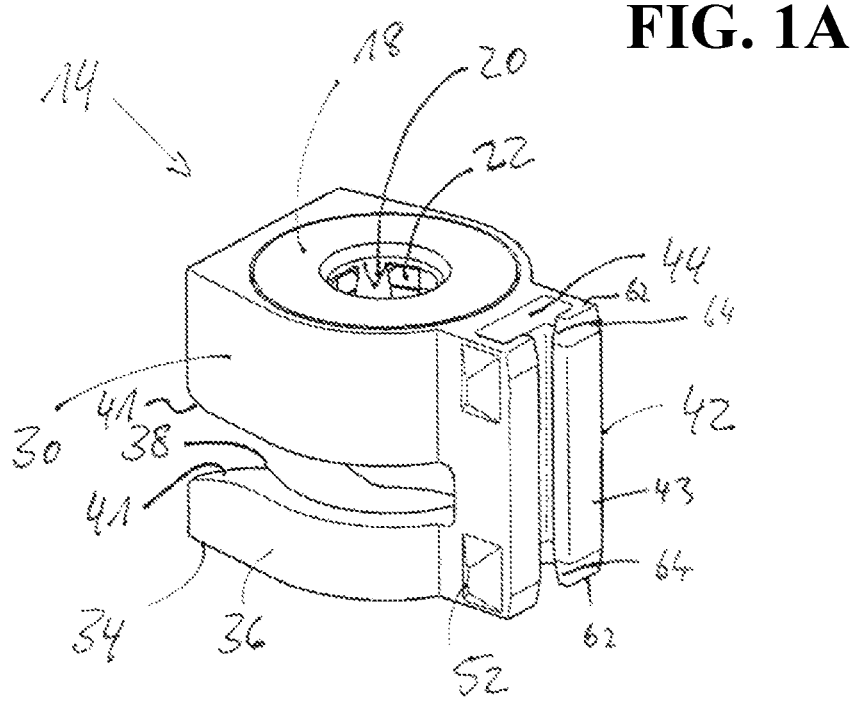
FIGS. 1A and 1B are perspective views of a tolerance-compensating device according to one first embodiment of the invention.
Figure 1B:
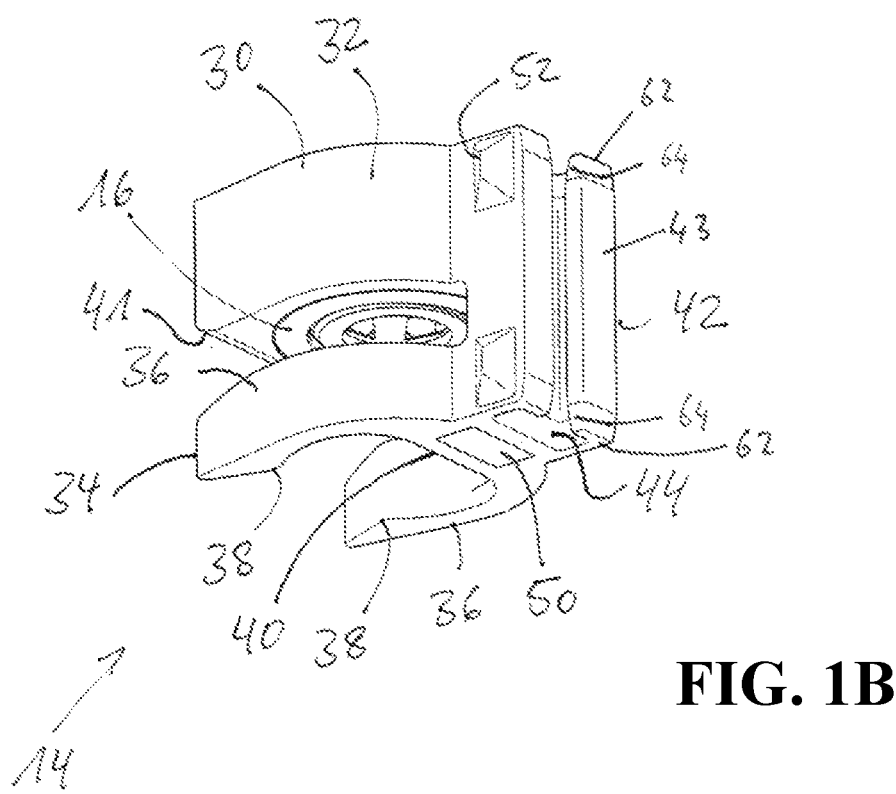

In FIGS. 1 to 4, a tolerance-compensating device 14 according to a first embodiment is shown. The tolerance-compensating device 14 comprises a base element 16 and a compensating element 18 which is in a left-hand threaded engagement therewith. The base element 16 forms a left-hand internal thread 16a for this purpose, while the compensating element 18 has a correspondingly formed external thread 18a. The thread axes of the internal thread 16a and the external thread 18a define an axial direction.

The base element 16 and the compensating element 18 form a passage 20 for a connecting screw (not shown), which passage extends in the axial direction. A spring element 22 is inserted into the part of the passage 20 that is defined by the compensating element 18, which spring element is provided for producing a frictional connection between the connecting screw which extends through the passage 20 and the compensating element 18. The spring element 22 transmits a torque of the connecting screw to the compensating element and is therefore also referred to as the torque transmission means.

Figure 2:
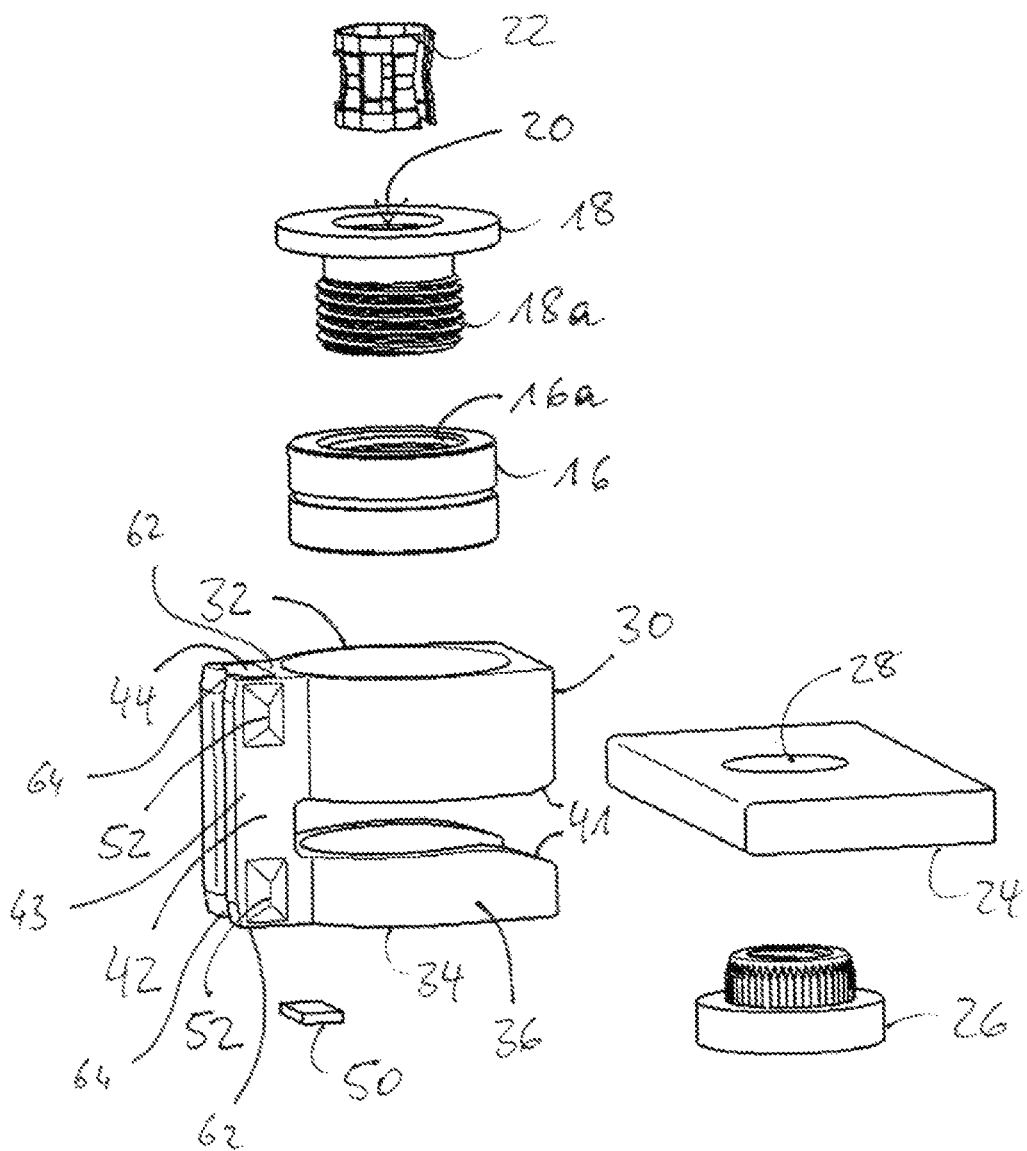
FIG. 2 is an exploded view of the tolerance-compensating device of FIG. 1.

The connecting screw is used to screw two components which are spaced apart from one another, of which a first component 24 is shown in FIG. 2. A nut element 26 for the connecting screw is non-rotatably attached to the first component 24.

In the present embodiment, the nut element 26 is a press nut which is pressed into a correspondingly provided receiving hole 28 of the first component 24. In this context, the term "press nut" is also understood to mean press-in nuts, blind-rivet nuts, flare nuts, drive(-in) nuts, etc. Moreover, it is conceivable to fasten the nut element 26 to the first component 24 in another way, for example by gluing or welding.

The tolerance-compensating device 14 further comprises a retaining element 30 formed of a plastics material, in which retaining element the base element 16 is non-rotatably retained. In the present embodiment, the base element 16 is pressed into the retaining element 30. It is also conceivable, however, to glue the base element 16 into the retaining element 30 or to shrink or injection-mold the retaining element 30 onto the base element 16. Specifically, the base element 16 is fitted in a retaining portion 32 of the retaining element 30, which portion extends substantially at a right angle to the axial direction.

Furthermore, the retaining element 30 forms a latching portion 34 which also extends substantially at a right angle to the axial direction. The latching portion 34 has an axial spacing from the retaining portion 32, which spacing is adapted to the thickness of the first component 24.

Figure 4:
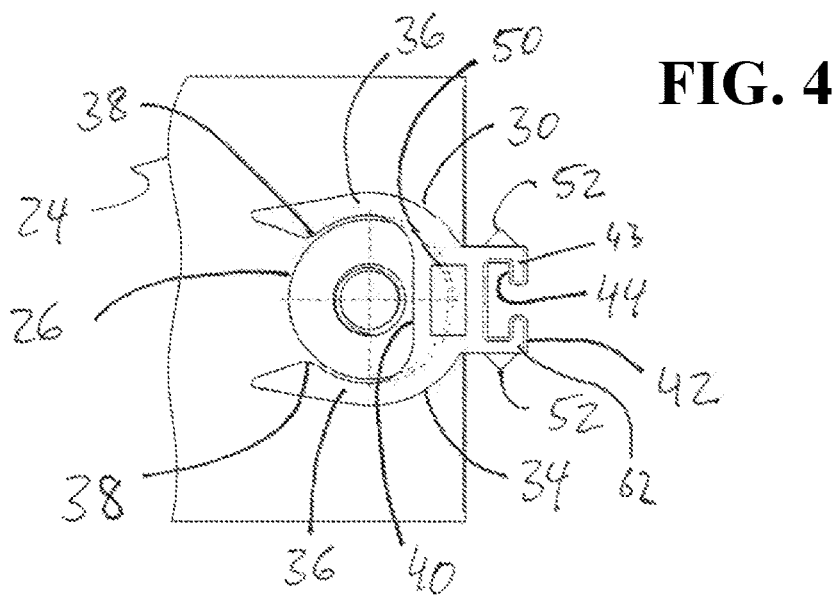
FIG. 4 is a plan view from below of the tolerance-compensating device of FIG. 1 in a completely pre-mounted state on a component.
Figure 6A:
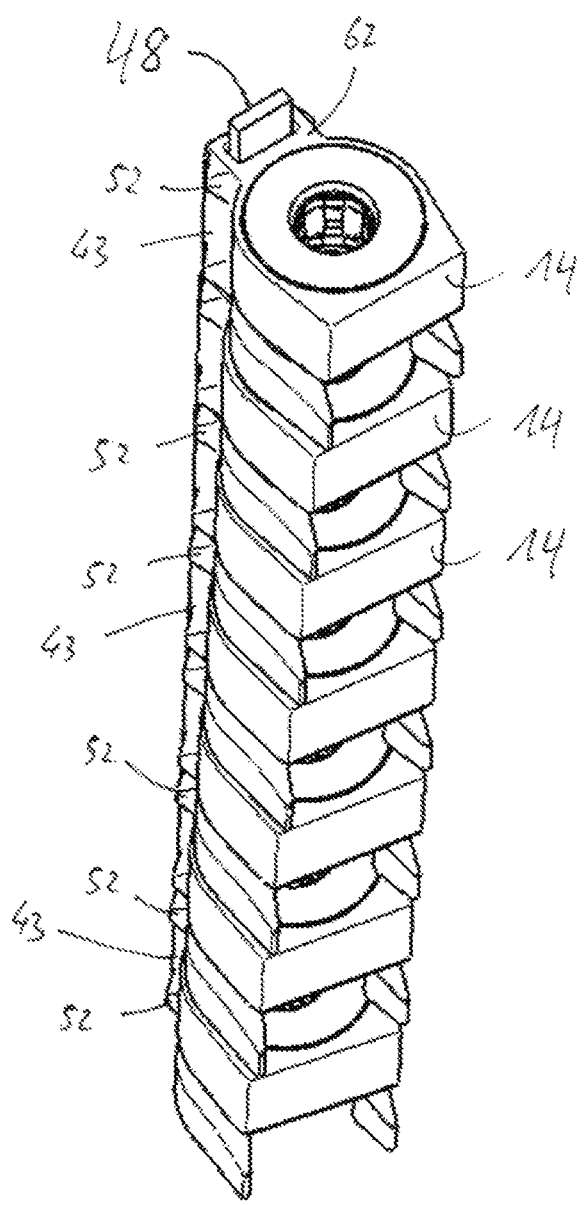
FIGS. 6A to 6D are various views of a plurality of tolerance-compensating devices of FIG. 1, which are threaded onto a flexible carrier element.
Figure 6B:
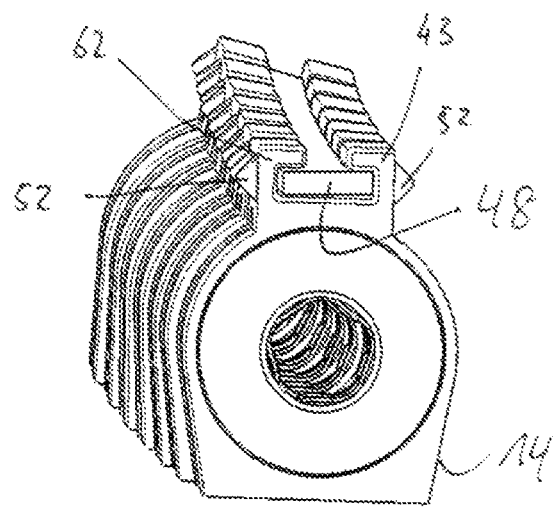
Figure 6C:
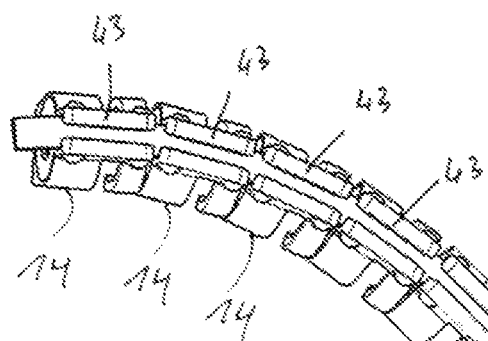
Figure 6D:
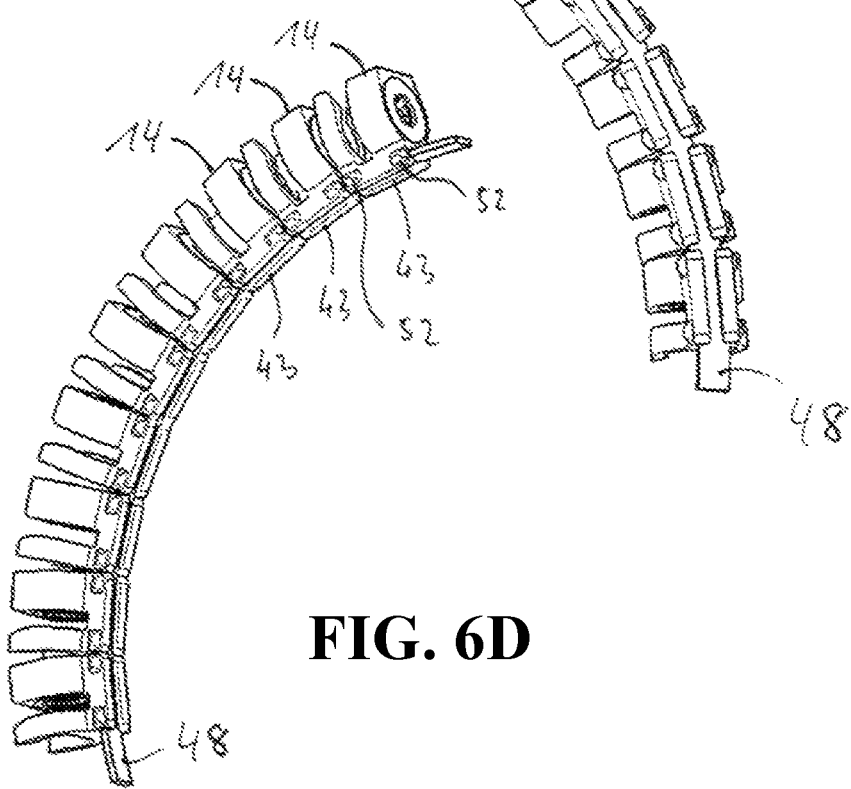

The latching portion 34 comprises two latching arms 36 which are spaced apart from one another, are curved slightly towards one another, and define a receiving portion for the nut element 26 between said arms. The latching arms 36 have a particular resilience, such that they can spread apart counter to a restoring force when pushed in a radial direction onto the nut element 26 and can spring back into the rest position thereof as soon as the nut element 26 is received in the receiving portion (FIG. 4). In order to prevent the latching portion 34 from unintentionally detaching from the received nut element 26, the latching arms 36 have mutually facing latching projections 38 in the region of the free ends thereof. In order to reinforce the latching arms 36, said arms are connected in the region of the bottom thereof by a reinforcing element 40 which partially projects over a nut element 26 received in the receiving portion.

Figure 3A:
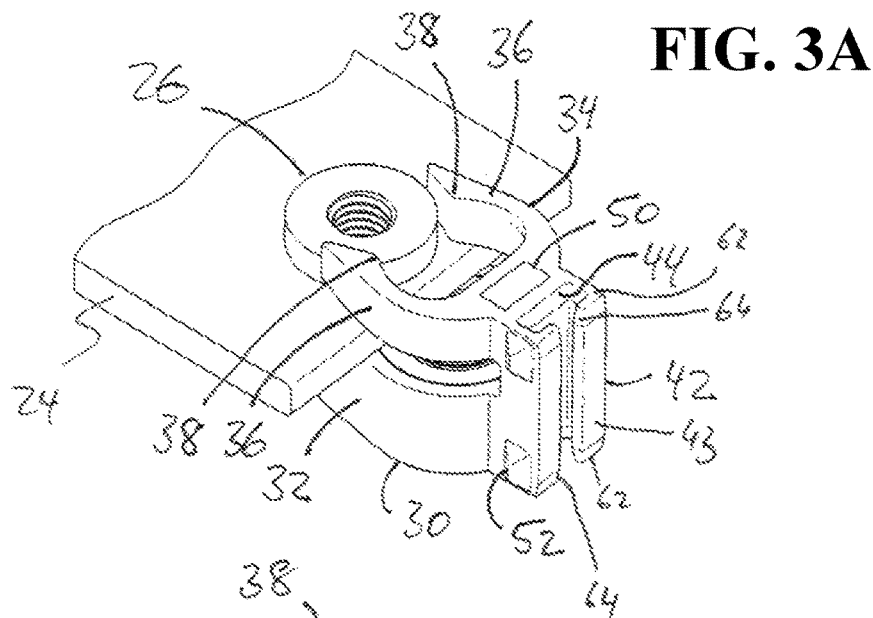
FIG. 3A is a perspective view of the tolerance-compensating device of FIG. 1 in a partially pre-mounted state on a component.
Figure 3B:
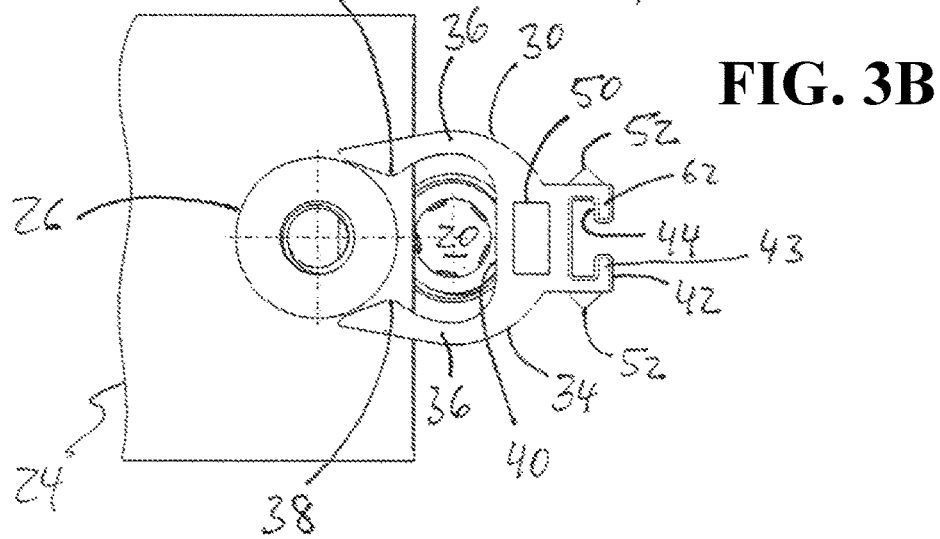
FIG. 3B is a plan view from below of the tolerance-compensating device of FIG. 1 in a partially pre-mounted state on a component.

To pre-mount the tolerance-compensating device 14 on the first component 24, the tolerance-compensating device 14 is slid laterally, i.e. in the radial direction, onto the first component 24 such that the first component is received between the retaining portion 32 and the latching portion 34 and the latching portion 34 latches to the nut element 26, as shown in FIGS. 3 and 4. In order to facilitate sliding the tolerance-compensating device 14 onto the first component 24, lead-in chamfers 41 are formed both in the region of the free ends of the latching arms 36, and in the corresponding region of the retaining portion 32.

In the pre-mounted state, the tolerance-compensating device 14 does not necessarily have to be fitted on the component 24 without clearance. Instead, a particular clearance of the tolerance-compensating device 14 which is latched to the nut element 26 is desired, at least in the radial direction but possibly also in the axial direction, since the subsequent screwing together of the components, in particular the orientation of the tolerance-compensating device 14 with the connecting screw, is facilitated as a result.

In order to screw together the components, the connecting screw is inserted through a corresponding hole in the component (not shown), and (in FIG. 1 from above) is guided through the passage 20 of the tolerance-compensating device 14 and screwed into the nut element 26. Due to the opposite-hand threads of the connecting screw and the tolerance-compensating device 14, while the connecting screw is being screwed into the nut element 26, the compensating element 18 is rotated out of the base element 16 by the frictional connection produced by the spring element 22, until said compensating element abuts the second component (not shown). From this point in time, the spacing between the components is bridged by the extended tolerance-compensating device 14, and the components can be clamped together by tightening the connecting screw.

The retaining portion 32 and the latching portion 34 are connected to one another by a connecting portion 42 which extends in the axial direction and to a certain extent forms the backbone of the retaining element 30. The connecting portion 42 has a cuboid basic shape and forms a T-slot 44 on the rear side thereof which faces away from the latching arms 36. The connecting portion 42 forms a coupling means 43, the function of which is addressed in greater detail in the following.

By means of the T-slot 44, the tolerance-compensating device 14 can be slid onto a correspondingly formed, T-shaped carrier element 46 for transport and/or storage purposes, as shown in FIG. 5 by means of three tolerance-compensating devices 14.

Alternatively, the T-slot 44 allows the tolerance-compensating device 14 to be threaded onto a flexible carrier element in the form of a carrier strip 48. FIG. 6 shows a carrier strip 48 of this kind that has a large number of tolerance-compensating devices 14 threaded thereon. A configuration of this kind is suitable, for example, for supplying the tolerance-compensating devices 14 to a setting robot for automated pre-mounting of the tolerance-compensating devices 14 on one or more components 24.

In principle, such a setting robot can be a gripping robot. Alternatively or additionally, however, the setting robot can also have a magnet for retaining the tolerance-compensating devices 14. For interaction with the magnet of the robot, an insert 50 made of a magnetizable, in particular ferromagnetic, material, for example sheet steel, is embedded in the retaining element 30, in the present embodiment in the region between the T-slot 44 and the reinforcing element 40. Furthermore, a magnetizable, in particular ferromagnetic, element can be provided on the coupling means 43 and advantageously embedded in the coupling means 43 (not shown in the drawings).

Figure 8:
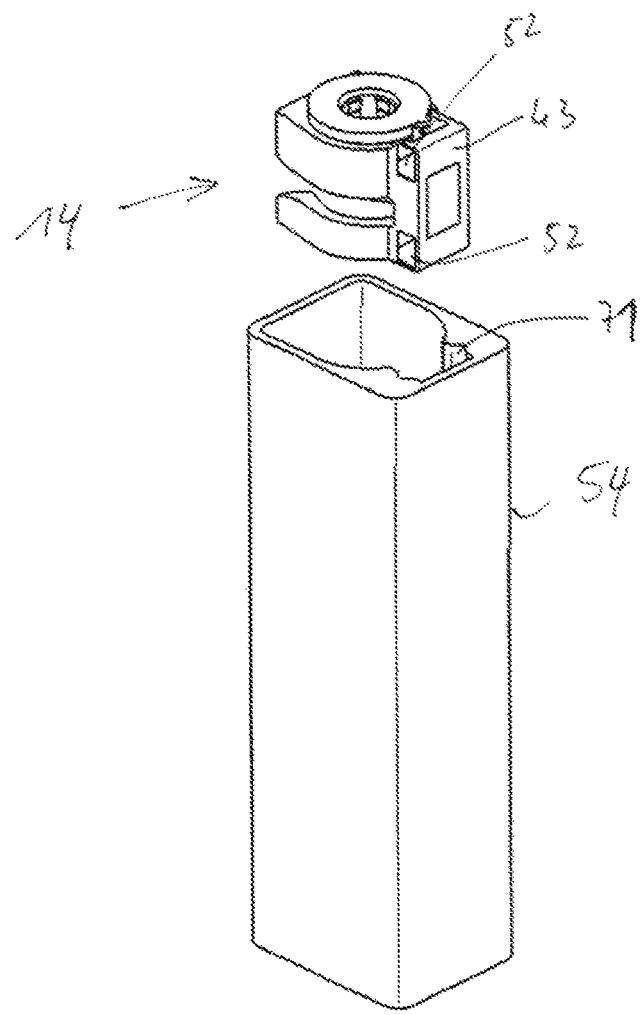
FIG. 8 shows a magazine for receiving tolerance-compensating devices according to FIG. 1 or 7.

In addition, two axially spaced-apart prismatic or hipped roof-like guide elements 52 are provided on opposite outer sides of the connecting portion 42, which elements are used to additionally guide the tolerance-compensating device 14 in a carrier element in the form of a magazine 54 (FIG. 8).

Figure 7:
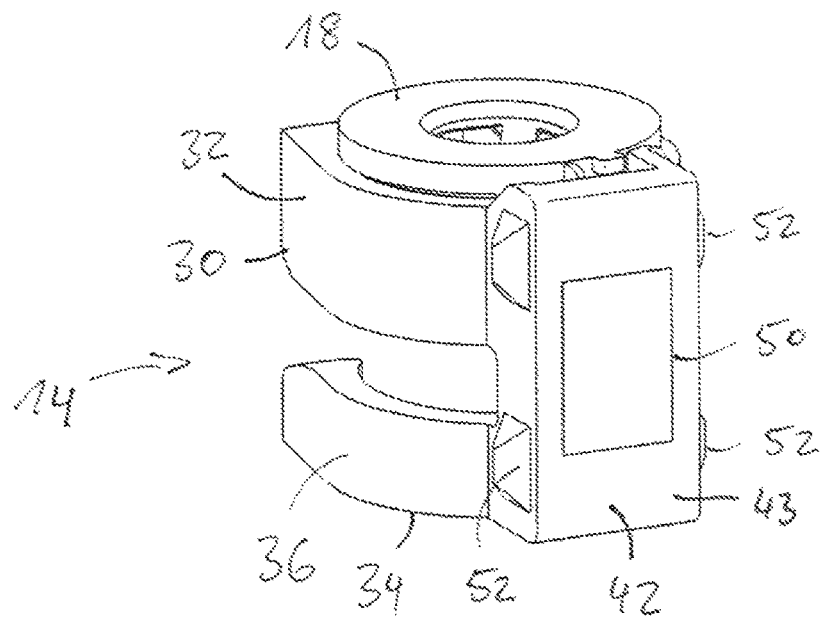
FIG. 7 shows a tolerance-compensating device according to a second embodiment of the invention.

FIG. 7 shows a tolerance-compensating device 14 according to a second embodiment which ultimately differs from the above-described first embodiment only in that the retaining element 30 does not have a T-slot 44, but instead the insert 50 which is made of ferromagnetic material is embedded into the rear side of the connecting portion 42 that faces away from the latching arms 36. As before, the guide elements 52 are used to guide the tolerance-compensating device 14 in the magazine 54.

FIGS. 9 to 15 show a tolerance-compensating device 14 according to a third embodiment, which differs from the tolerance-compensating device 14 according to the first embodiment in the design of both the retaining element 30 and the coupling means 43. The retaining element 30 according to the tolerance-compensating device 14 according to the third embodiment is substantially annular and has two clip arms 56 which project from the retaining element 30 in the axial direction. The clip arms 56 are used to fasten the tolerance-compensating device 14 to a correspondingly formed first component.

Figure 16:
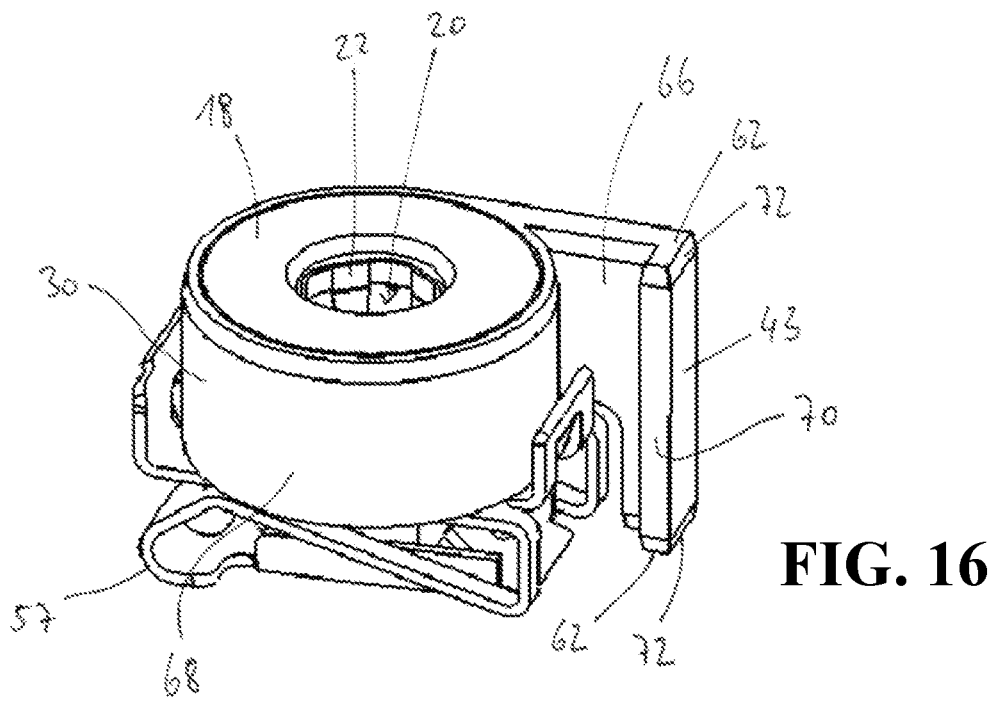
FIG. 16 is a perspective view of a tolerance-compensating device according to a fourth embodiment.
Figure 17:
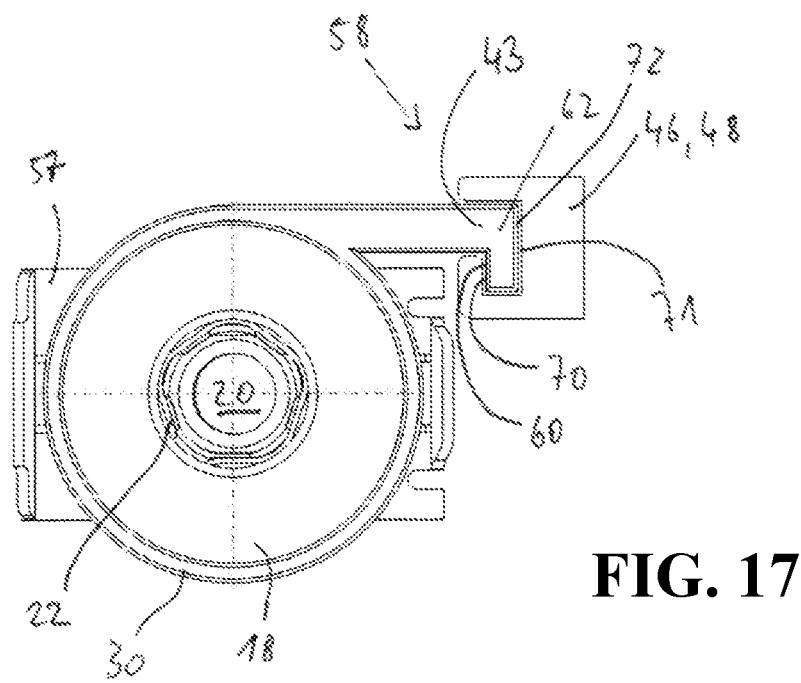
FIG. 17 is a plan view of a tolerance-compensating device according to FIG. 16 that is coupled to a carrier element.

FIGS. 16 and 17 show a tolerance-compensating device 14 according to a fourth embodiment which differs from the tolerance-compensating device 14 according to the third embodiment only in the design of the retaining element 30 and of the coupling means 43. In the tolerance-compensating device 14 according to the fourth embodiment, a retaining clamp 57 is attached to the retaining element 30. A nut element (not visible in the drawings) for the connecting screw is stored in the retaining clamp 57. The retaining clamp 57 is also used for clamping the tolerance-compensating device 14 to a first component.

The design of the relevant coupling means 43 of the tolerance-compensating devices 14 according to the third and fourth embodiment is explained in greater detail in the following, with reference to the relevant drawings.

Figure 18:
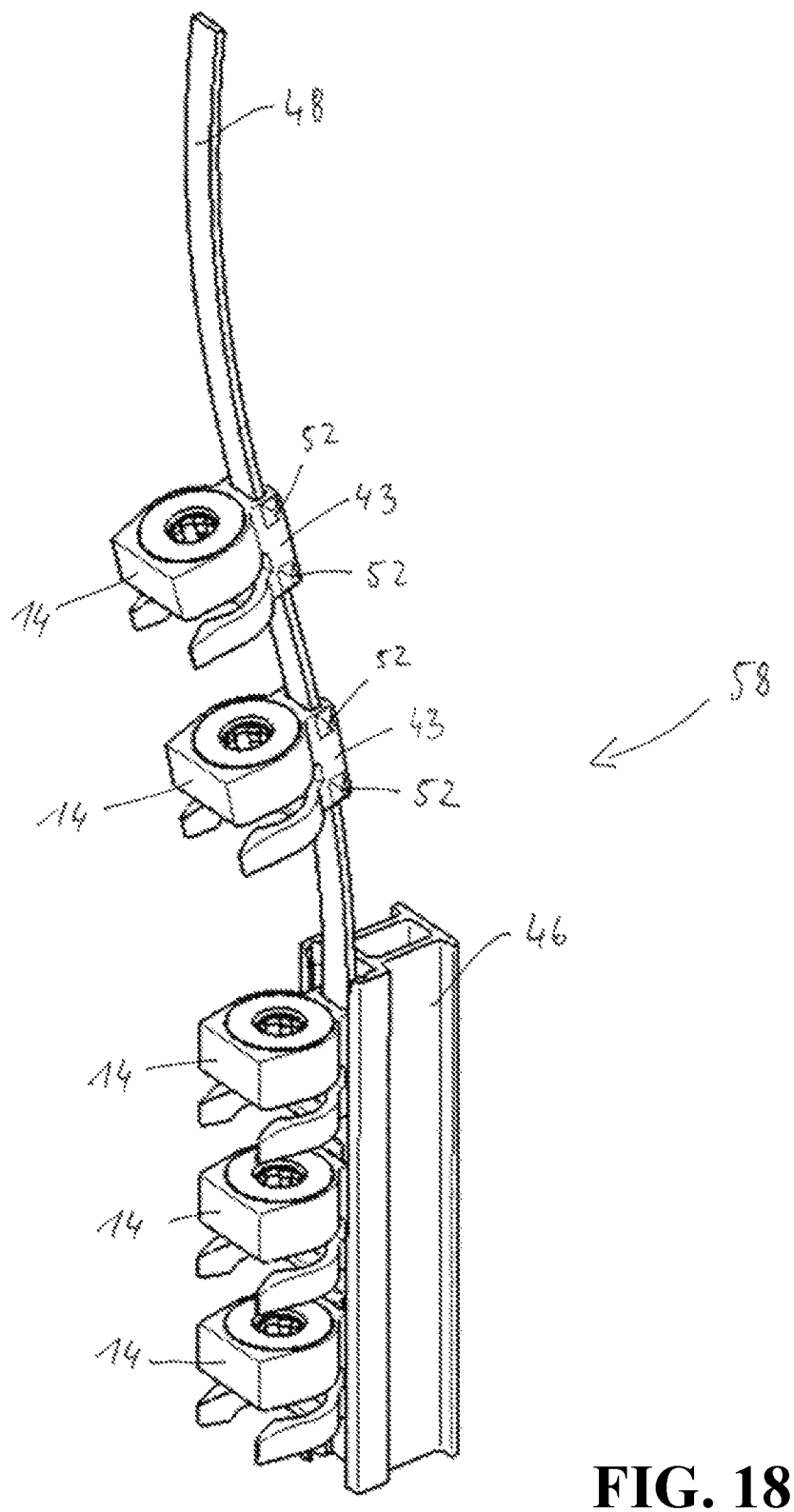
FIG. 18 is a perspective view of a system comprising a plurality of tolerance-compensating devices of FIG. 1 and two carrier elements.

The coupling means 43 is designed to couple the tolerance-compensating device 14 to a carrier element 46, 48, 54 such that the tolerance-compensating device 14 can be moved along the carrier element 46, 48, 54. In this case the carrier element can be a rigid carrier element 46 (FIGS. 5A and 5B) or a flexible carrier element 48 (FIG. 6A to 6D). Moreover, a combination of rigid and flexible carrier elements 46, 48 is also conceivable, as shown in FIG. 18, for example. Furthermore, a tubular carrier element 54 which radially surrounds (FIG. 8) the coupled tolerance-compensating devices 14 is also conceivable. A tubular carrier element 54 of this kind can in particular be used as a storage magazine for a plurality of tolerance-compensating devices 14.

In all of these cases, the carrier element 46, 48, 54 and at least one tolerance-compensating device 14 which is coupled thereto form a system 58 in which the carrier element 46, 48, 54 is used to receive and guide at least one tolerance-compensating device 14.

In the case that the system 58 comprises a plurality of different carrier elements 46, 48, the individual carrier elements 46, 48 can transition into one another to guide the tolerance-compensating devices 14 continuously, as can be seen in FIG. 18. In this case, both the coupling means 43 and the hipped roof-like guide elements 52 formed on the coupling means 43 contribute to guiding the individual tolerance-compensating devices 14. In the embodiment shown in FIG. 18, the coupling means 43 are used to guide the relevant tolerance-compensating device 14 on the flexible carrier element 48, while the guide elements 52 are used to guide the tolerance-compensating element 14 on the rigid carrier element 46.

The different coupling means 43 are explained in greater detail in the following. In the drawings, the coupling means 43 is in each case formed on the retaining element 30. It is also conceivable, however, for the coupling means 43 to be provided on the base element 16 or even on the compensating element 18.

As can be seen in the drawings, the coupling means 43 in each case has a longitudinal extension which is oriented at least approximately parallel to the passage 20 which defines the axial direction. In principle, the longitudinal extension of a coupling means 43 can also, however, be orientated transversely, in particular at a right angle, to the axial direction.

The tolerance-compensating devices 14 shown in FIGS. 1 to 6D and FIG. 18 each have a coupling means 43 comprising a slot 44 which defines at least one undercut 60. In the embodiments shown in FIGS. 1 to 6D and FIG. 18, the slot 44 in each case has two undercuts 60 and is therefore designed as a T-slot. The slot 44 could also, however, be designed as an L-slot, a round slot, a dovetail slot or similar.

In order for it to be possible to thread the tolerance-compensating device 14 onto the carrier element 46, 48, 54 more easily, the slot 44 has a widening portion 64 on each opposite longitudinal end 62.

According to an alternative embodiment, the coupling means 43 can also be designed in the form of an arm 66 which defines at least one undercut 60. The arm 66 can extend radially outwards (FIGS. 9 to 15) from an outer wall 68 of the retaining element 30. According to a variant shown in FIGS. 16 and 17, the arm 66 can also extend tangentially away from the outer wall 68 of the retaining element 30.

In the case that the coupling means 43 is provided on the base element 16 or compensating element 18, the arm 66 can extend radially or tangentially away from the relevant outer wall of the base element 16 or of the compensating element 18.

Figure 9:
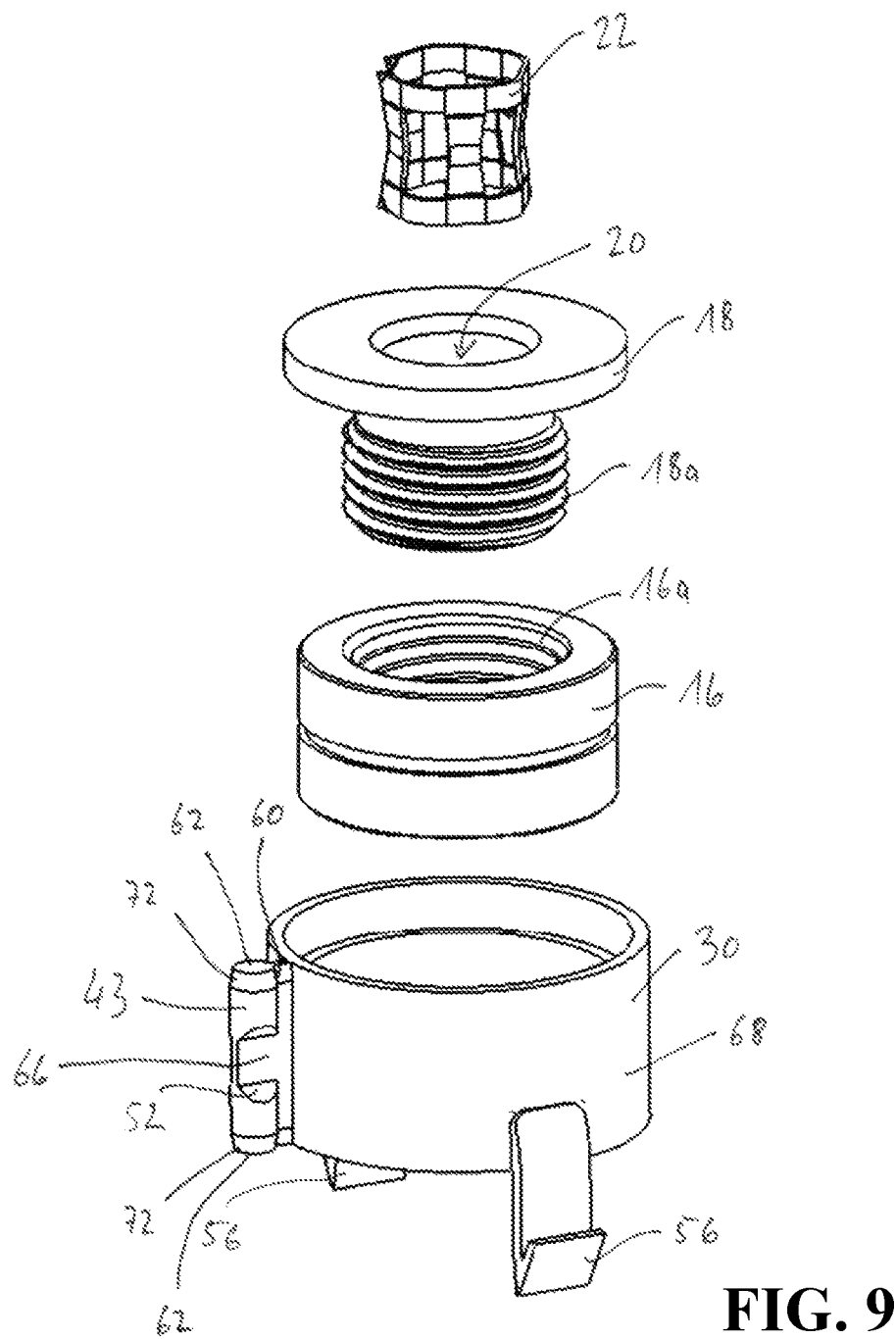
FIG. 9 is an exploded view of a tolerance-compensating device according to a third embodiment.
Figure 10:
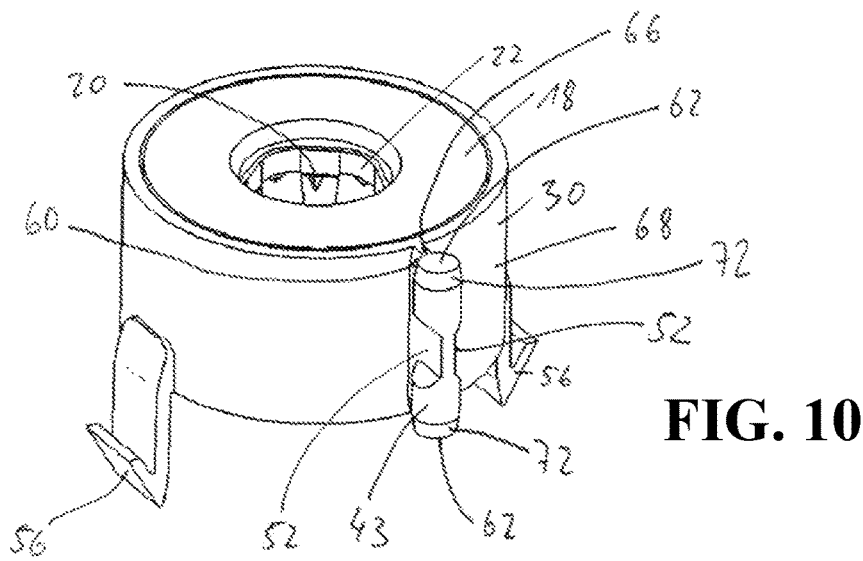
FIG. 10 is a perspective view of the tolerance-compensating device of FIG. 9 comprising a first design variation of a coupling means.
Figure 11:
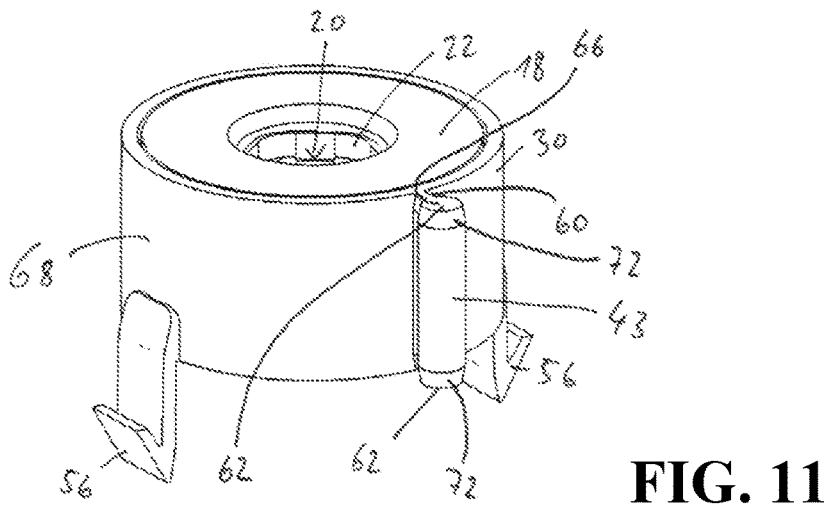
FIG. 11 is a perspective view of the tolerance-compensating device of FIG. 9 comprising a second design variation of the coupling means.
Figure 12:
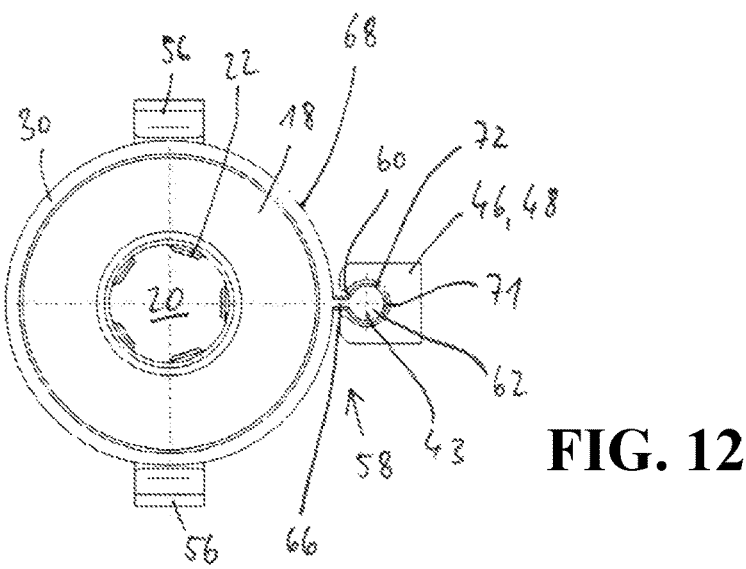
FIG. 12 is a plan view of a tolerance-compensating device according to FIG. 10 or 11 that is coupled to a carrier element.

As can be seen in FIGS. 9 to 11, and particularly in the cross-sectional view in FIG. 12, the arm 66 which defines the undercut 60 can have a round or mushroom-like cross section. Alternatively, the arm 66 can also transition into at least one angled hook portion 70 on the free end thereof which faces away from the outer wall 68, such that the coupling means 43 as a whole has a T-shaped cross section (FIG. 15) or an L-shaped cross section (FIG. 17). Other cross-sectional shapes of the coupling means 43 are also conceivable, however, such as a dovetail cross section. It is self-evident that, when the tolerance-compensating device 14 is in a coupled state, the coupling means 43 is guided in a complementary slot 71 of the carrier element 46, 48, 54.

In order to thread the tolerance-compensating device 14 more easily, the tolerance-compensating devices 14 shown in FIGS. 9 to 17 have a tapering portion 72 on each of the longitudinal ends 62 thereof.

Figure 13:
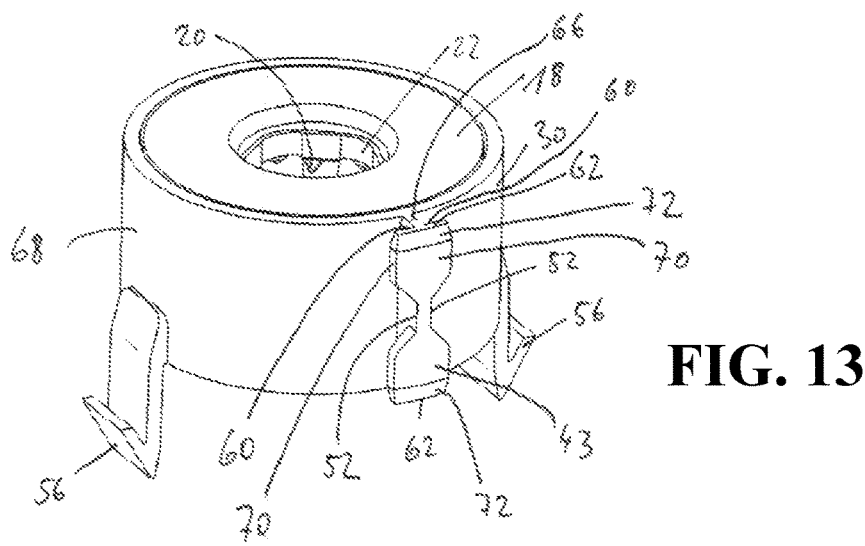
FIG. 13 is a perspective view of the tolerance-compensating device of FIG. 9 comprising a third design variation of the coupling means.
Figure 14:
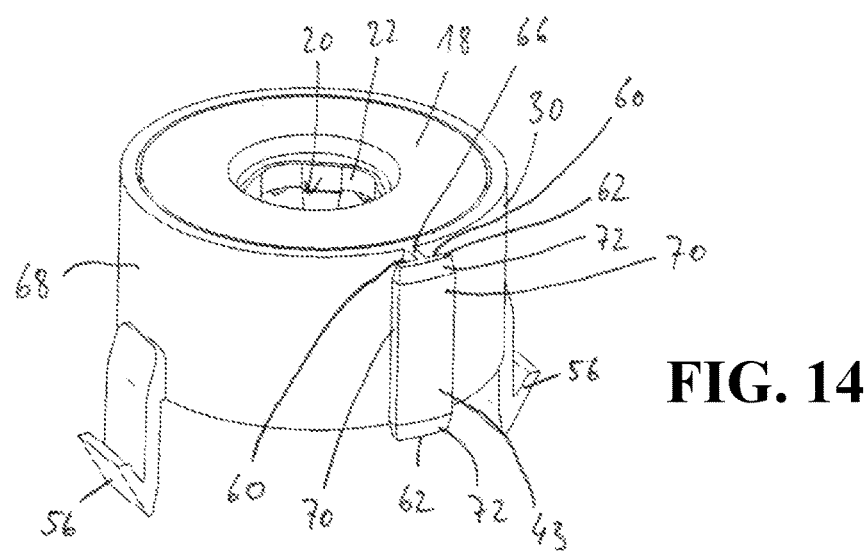
FIG. 14 is a perspective view of the tolerance-compensating device of FIG. 9 comprising a fourth design variation of the coupling means.
Figure 15:
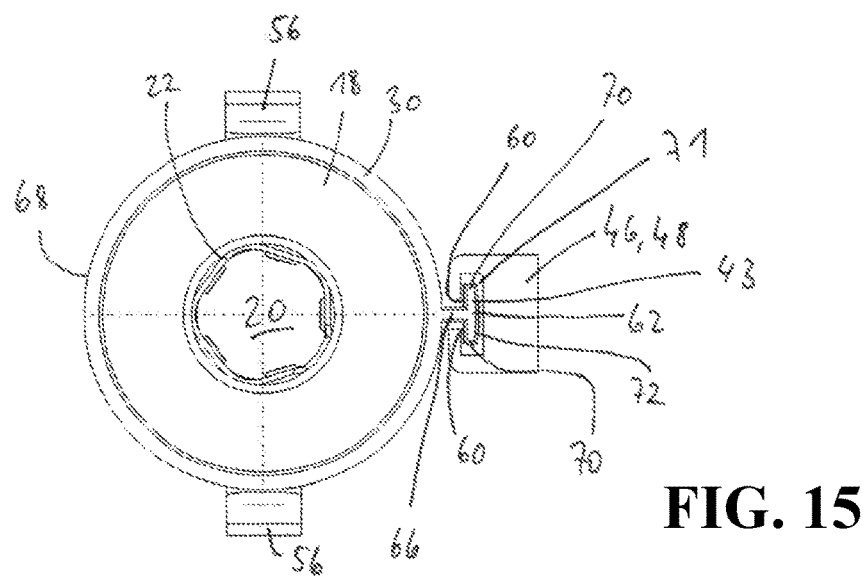
FIG. 15 is a plan view of a tolerance-compensating device according to FIG. 13 or 14 that is coupled to a carrier element.

In order for a setting robot (not shown in the drawings) to be able to better grip and orientate the tolerance-compensating device 14, guide elements 52 can be provided on the coupling means 43. The guide elements 52 can project on the coupling means 43 in the manner of a hipped roof, as can easily be seen in FIGS. 1A and 1B. It is also possible, however, that the guide elements 52 are formed on the coupling means 43 in the form of notches (FIGS. 9, 10 and 13).

LIST OF REFERENCE NUMERALS

14 Tolerance-compensating device
16 Base element

18 Compensating element
16a Internal thread
18a External thread
20 Passage
22 Spring element
24 First component
26 Nut element
28 Receiving hole
30 Retaining element
32 Retaining portion
34 Latching portion
36 Latching arm
38 Latching projection
40 Reinforcing element
41 Lead-in chamfer
42 Connecting portion
43 Coupling means
44 T-slot
46 T-shaped carrier
48 Carrier strip
50 Insert
52 Guide element
54 Magazine
56 Clip arms
57 Retaining clamp
58 System
60 Undercut
62 Longitudinal end
64 Widened portion
66 Arm
68 Outer wall
70 Hook portion
71 Slot
72 Tapered portion

The invention claimed is:

1. A system comprising:
at least one device for compensating for tolerances between two components which are to be connected by a connecting screw; and
a carrier element for receiving and guiding the at least one device,
the device comprising:
  a base element;
  a compensating element which can be moved out of the base element, the base element and the compensating element forming a passage for the connecting screw that defines an axial direction; and
  a coupling means operable to couple the device to the carrier element and to guide the device along the carrier element, the coupling means comprising a guidance channel or a guidance protrusion, wherein a main extension axis of the guidance channel or the guidance protrusion is oriented at least approximately parallel to the axial direction to guide the device along the carrier element.

2. The system according to claim 1, wherein the coupling means is formed on the base element.

3. The system according to claim 1, wherein the coupling means is formed on a retaining element for retaining the base element.

4. The system according to claim 3, wherein the coupling means comprises an arm which defines at least one undercut and extends radially or tangentially away from an outer wall of the retaining element.

5. The system according to claim 1, wherein the coupling means comprises a slot which defines at least one undercut.

6. The system according to claim 5, wherein the slot is a T-slot, an L-slot, a round slot, or a dovetail slot.

7. The system according to claim 5, wherein the slot has longitudinal ends and a widening portion on at least one of the longitudinal ends.

8. The system according to claim 1, wherein the coupling means comprises an arm which defines at least one undercut and extends radially or tangentially away from an outer wall of the base element.

9. The system according to claim 8, wherein the coupling means has a tapering portion on at least one of the longitudinal ends thereof.

10. The system according to claim 8, wherein the arm transitions into at least one angled hook portion at the free end thereof which faces away from the outer wall.

11. The system according to claim 8, wherein the coupling means has a cross section that is T-shaped, L-shaped, or round.

12. The system according to claim 8, wherein the coupling means has a cross section in the shape of a mushroom or dovetail.

13. The system according to claim 1, wherein a magnetizable element is provided on the coupling means.

14. The system according to claim 13, wherein a ferromagnetic element is provided on the coupling means.

15. The system according to claim 13, wherein the magnetizable element is recessed in the coupling means.

16. The system according to claim 1, wherein the device is movably guidable relative to the carrier element by the coupling means.

17. The system according to claim 1, wherein the carrier element is flexible at least in portions and/or is rigid at least in portions.

18. The system according to claim 1, wherein the guidance channel or guidance protrusion is continuous in the axial direction.

* * * * *